United States Patent
Schwantner

(10) Patent No.: US 9,333,910 B2
(45) Date of Patent: May 10, 2016

(54) DISPLAY ELEMENT, DISPLAY INSTRUMENT, DISPLAY METHOD, USE OF AN OPTICAL WAVEGUIDE AND VEHICLE

(71) Applicant: AUDI AG, Ingolstadt (DE)

(72) Inventor: Stephan Schwantner, Haunstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/413,764

(22) PCT Filed: Jul. 9, 2013

(86) PCT No.: PCT/EP2013/002013
§ 371 (c)(1),
(2) Date: Jan. 9, 2015

(87) PCT Pub. No.: WO2014/015945
PCT Pub. Date: Jan. 30, 2014

(65) Prior Publication Data
US 2015/0158423 A1 Jun. 11, 2015

(30) Foreign Application Priority Data
Jul. 21, 2012 (DE) .......................... 10 2012 014 452

(51) Int. Cl.
*F01P 11/16* (2006.01)
*B60Q 3/04* (2006.01)
*B60K 35/00* (2006.01)
(Continued)

(52) U.S. Cl.
CPC ............... *B60Q 3/044* (2013.01); *B60K 35/00* (2013.01); *F21V 7/00* (2013.01); *B60K 2350/901* (2013.01); *B60K 2350/921* (2013.01);
(Continued)

(58) Field of Classification Search
CPC .......... G12B 11/00; G12B 11/02; G12B 11/04
USPC ............................................. 362/23.01–23.22
See application file for complete search history.

(56) References Cited

U.S. PATENT DOCUMENTS 4,244,317 A 1/1981 Rauch
5,673,987 A 10/1997 Futschik et al.
(Continued)

FOREIGN PATENT DOCUMENTS

DE 2806728 8/1978
DE 19532427 11/1996
(Continued)

OTHER PUBLICATIONS

WIPO English Language Translation of the International Preliminary Report on Patentability mailed Jan. 22, 2015 for International Patent Application No. PCT/EP2013/002013, 6 pages.
(Continued)

*Primary Examiner* — Sean Gramling
(74) *Attorney, Agent, or Firm* — Staas & Halsey LLP

(57) ABSTRACT

A display element can be used to represent bars of variable length. The display instrument may have a plurality of light chambers which are disposed adjacent to one another and in each case have a light barrier to the respective adjacent light chamber. The light chambers each have an optical waveguide. The light barrier is formed from one side of the optical waveguide which is impermeable to light or only partially light-permeable. Moreover, a corresponding display instrument, vehicle and display method may use the optical waveguide and the display element.

14 Claims, 1 Drawing Sheet

(51) Int. Cl.
*F21V 7/00* (2006.01)
*G12B 11/02* (2006.01)
*G12B 11/00* (2006.01)
*F21Y 101/02* (2006.01)

(52) U.S. Cl.
CPC ............ *F21Y 2101/02* (2013.01); *G12B 11/00* (2013.01); *G12B 11/02* (2013.01)

(56) References Cited

U.S. PATENT DOCUMENTS

| | | | |
|---|---|---|---|
| 5,949,346 | A | 9/1999 | Suzuki et al. |
| 7,126,564 | B2 | 10/2006 | Schach et al. |
| 2002/0149495 | A1* | 10/2002 | Schach ................. B60Q 3/044 340/815.78 |
| 2009/0128741 | A1* | 5/2009 | Peng ................. G02F 1/133603 349/67 |
| 2010/0232138 | A1 | 9/2010 | Tsai |
| 2012/0014092 | A1 | 1/2012 | Lee et al. |

FOREIGN PATENT DOCUMENTS

| | | |
|---|---|---|
| DE | 19622900 | 12/1996 |
| DE | 19606245 | 8/1997 |
| DE | 102010035717 | 3/2012 |
| JP | 2002-365096 | 12/2002 |
| JP | 2004-354455 | 12/2004 |

OTHER PUBLICATIONS

German Office Action for German Priority Patent Application No. 10 2012 014 452.0, issued Apr. 29, 2013, 5 pages.
English language International Search Report for PCT/EP2013/002013, mailed Apr. 25, 2014, 3 pages.

* cited by examiner

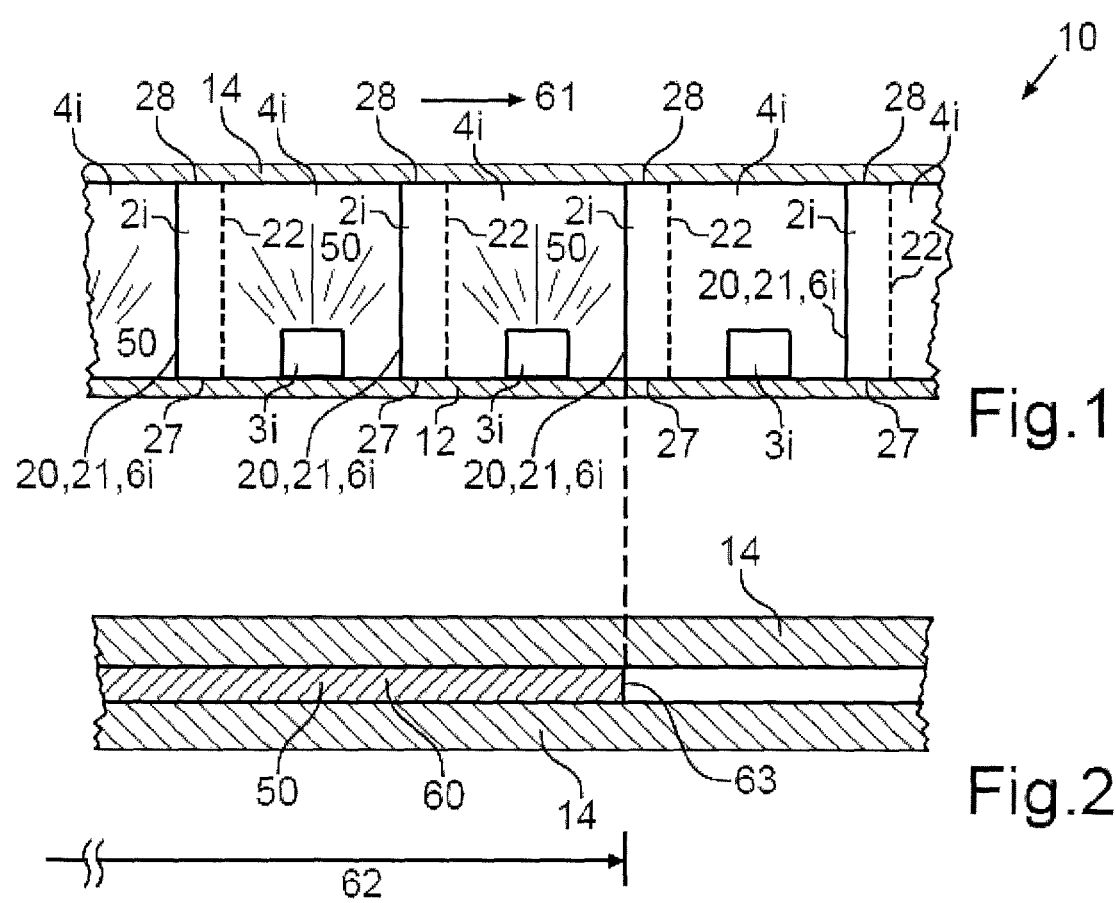

DISPLAY ELEMENT, DISPLAY INSTRUMENT, DISPLAY METHOD, USE OF AN OPTICAL WAVEGUIDE AND VEHICLE

CROSS REFERENCE TO RELATED APPLICATIONS

This application is based on and hereby claims priority to International Application No. PCT/EP2013/002013 filed on Jul. 9, 2013 and German Application No. 10 2012 014 452.0 filed on Jul. 21, 2012, the contents of which are hereby incorporated by reference.

BACKGROUND

The present invention relates to a display element comprising a plurality of light chambers arranged alongside one another and each having a light barrier to the respectively adjacent light chamber. Moreover, the invention relates to a display instrument and a vehicle. Furthermore, the invention relates to a display method.

The display element can be used for example for a fuel level indicator, for a speedometer or for a tachometer. The display element can be a part of an instrument cluster.

US 2012/014092 A1 describes a light guide plate having a plurality of prism-shaped cutouts in which light-emitting diodes are arranged.

JP 2004 354455 A discloses chambers having light-reflecting side walls. The side walls belong to a housing part composed of white plastic.

JP 2002 365096 A describes convex reflection surfaces arranged between light sources.

US 2010/232138 A1 describes a light guide plate having grooves in which light sources are arranged. In order to generate softer light in the light guide plate, an optical structure is fitted in each case at a groove side, said optical structure including for example of fine points which reflect and refract light.

DE 196 22 900 A1 describes a display element comprising a plurality of photoconductor parts arranged alongside one another, at each of which a reflection film is arranged either at a right or left mounting surface of the photoconductor parts.

DE 196 06 245 B4 proposes a display instrument comprising light chambers which can be actuated separately and the partitions of which are embodied as optical waveguides.

This known display technology has the disadvantage that this type of bar representation (bar graph representation) imparts to the user a rough and/or smudged and thus outdated impression. This is because the bar region currently illuminated in each case is not represented in an uninterrupted fashion on account of the partitions between the light chambers. On account of the presently customary high resolution of pictorial representations on computer screens and smartphones, users' expectations have also risen with respect to an optical exactness of other types of electronic displays.

SUMMARY

One potential object is to provide a display element whose representation complies with present-day expectations with respect to a technically impeccable optical output.

The inventor proposes a display element that has a plurality of light chambers arranged alongside one another and each having a light barrier to a respectively adjacent light chamber. The light chambers each comprise an optical waveguide, wherein the light barrier is formed by a side of the optical waveguide which is light-nontransmissive (i.e. not light-transmissive) or only partly light-transmissive. The optical waveguide is spaced apart from an optical waveguide of the respectively adjacent light chamber.

With regard to a display instrument, the display instrument may comprise the proposed display element.

A vehicle may have the proposed display element and/or the proposed display instrument.

With regard to the display method, during a display by the proposed display element, between currently illuminated light chambers no light chamber is left unilluminated, such that an uninterrupted bar (bar graph) is represented by the display element.

With regard to the use of an optical waveguide, the object is achieved by virtue of the fact that a light-nontransmissive or only partly light-transmissive side of an optical waveguide is used as a partition of a light chamber of a display element, wherein the optical waveguide is spaced apart from an optical waveguide of a respectively adjacent light chamber.

By the light-nontransmissive (i.e. not light-transmissive) or only partly light-transmissive side of the optical waveguide, the light generated in and/or for a light chamber is absorbed and/or reflected at the light-nontransmissive or only partly light-transmissive side of the optical waveguide. If adjacent light chambers are illuminated in an uninterrupted fashion by light-chamber-specific light sources, an observer is given the optical impression (the illusion) that there is only a single continuous light chamber.

On the one hand, by the light flooding of the optical waveguides as far as the light-nontransmissive or only partly light-transmissive side of the optical waveguide of the last illuminated light chamber, a single continuous light source is suggested to the user. On the other hand, the light-nontransmissive or only partly light-transmissive side of the optical waveguide prevents light from shining through into the nearest unilluminated light chamber. A very precisely delimited illumination of a scale is thus achieved.

On account of the very precise delimitation, the observer cannot readily infer from the optical appearance of the display the stepped nature thereof. Therefore, during the operation of the display element, the user obtains from the display element the same impression as if a display element having a sharply delimited analog display were involved. In the case of a plurality of light chambers connected in series, this gives the impression of a continuous light bar (bar graph) which resembles an analog display (actuated in a stepped fashion) having no quantization (i.e. an infinitely high resolution) in terms of its display capabilities. Consequently, the proposed display element provides a display meeting expectations with respect to an elegant, technically impeccable optical output.

It is preferred if the light-nontransmissive or only partly light-transmissive side is reflectively coated or partly reflectively coated. An efficiency of the display is improved as a result. The efficiency here is a ratio between a light intensity of the display that can be perceived by the user and a light intensity of the light-chamber-specific light sources. Moreover, with the reflectively coated or partly reflectively coated area, it is also possible to improve a light distribution within the light chambers.

It is expedient if a second side of the optical waveguide is diametrically opposite the first side of the optical waveguide and is light-transmissive. A light edge that can be perceived by the user within a bar segment is avoided as a result.

It is particularly preferred if the light chambers are arranged in an ordered manner alongside one another. As a result, the display element then be used for a bar display (i.e.

for representing a bar graph) that is intuitively easily understandable for the user, for the purpose of displaying a quasi-analog value.

One embodiment provides for the light chambers each to comprise at least one electrical light source.

It is advantageous if the electrical light source comprises an LED. Each of the two aforementioned measures makes a contribution for a cost-effective realization of the display with proven technologies.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 schematically shows a lateral longitudinal section through a bar display element during operation of the bar display element; and FIG. 2 schematically shows a plan view of the bar display element during the operation of the bar display element.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The bar display element 10 shown in FIG. 1 comprises a printed circuit board 12, on which a plurality of optical waveguides 2are arranged transversely with respect to the bar direction 61. A dial plate 14 of the bar display element 10 is arranged parallel to the printed circuit board 12. The optical waveguides 12 in each case terminate flush with the printed circuit board 12 at a lower edge 27 and flush with the dial plate 14 at an upper edge 28. Individually actuatable light sources 3(typically LEDs) are arranged between the optical waveguides 2i. Each of the optical waveguides 2has a specularly reflective and/or light-nontransmissive surface 20 on a first 21 of its two sides 21, 22 that face adjacent optical waveguides 2.

Firstly, the light-nontransmissive first sides 21 of the optical waveguides 2define boundaries of light chambers 4at which the light sources 3are prevented from shining into light chambers 4adjacent to the respectively dedicated light chamber 4. In particular, that light chamber 4which is directly adjacent to the last light chamber 4currently illuminated (for a bar length 62 currently to be displayed) remains unilluminated as a result. This has the advantage that the actually illuminated end 63 of the bar (which end is important for the user because said user reads the indicated current quasi-analog value on the basis of the bar end 63) corresponds exactly to the current light boundary 6of the last illuminated light chamber 4in the series of light chambers 4.

Secondly, by virtue of the fact that the optical waveguide 2is light-transmissive on the second 22 of its two sides 21, 22 (that face adjacent optical waveguides 2), light 50 emerging from the light sources 3can propagate in each case as far as the very narrow boundary 6of the light chambers 4. This has the advantage that the boundary 63 between an illuminated and an unilluminated light chamber 4does not become blurred, but rather is represented very precisely. If between illuminated light chambers 4no light chamber 4is left unilluminated, the bar display 10 imparts to the user visually the advantageous impression of a continuously variable, highly accurate display.

The specularly reflective and/or light-nontransmissive surface 20 improves a light distribution within the light chamber 4and a luminous efficiency.

FIG. 2 schematically shows a plan view of the bar display element 10 during the operation of the bar display element 10.

The proposed bar display element 10 has the following advantages:

An extremely high resolution of the display 10 is suggested with the uninterrupted light bar 60 (bar graph).

The bar display 10 enacts a futuristic design for the user.

The bar display element 10 is robust and cost-effective in terms of producibility and usability. Additional costs arise only as a result of the costs for producing light-nontransmissivity or producing only partial light-transmissivity.

The bar (bar graph) 60 can be configured with arbitrary width profiles and curvature profiles.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A display element comprising:
   a plurality of light chambers arranged alongside one another, each comprising:
   a light barrier to a respectively adjacent light chamber; and
   an optical waveguide provided for each light chamber so as to be spaced apart from the optical waveguide of the respectively adjacent light chamber, wherein
   each optical waveguide has a side which is light-nontransmissive or only partly light-transmissive, to thereby form the light barrier to the respectively adjacent light chamber.
   wherein
   the display element further comprises:
   a printed circuit board; and
   a dial plate arranged substantially parallel to the printed circuit board,
   each optical waveguide extends from the printed circuit board to the dial plate, each optical waveguide having a lower edged flush with the printed circuit board and an upper edge flush with the dial plate.

2. The display element as claimed in claim 1, wherein a reflective coating or a partly reflective coating is used to respectively form the side of each optical waveguide which is light-nontransmissive or only partly light-transmissive side.

3. The display element as claimed in claim 1, wherein
   a first side of each optical waveguide is light-nontransmissive or only partly light-transmissive, and
   a second side of each optical waveguide diametrically opposite the first side of the optical waveguide, is light-transmissive.

4. The display element as claimed in claim 1, wherein the light chambers are arranged in an ordered manner alongside one another.

5. The display element as claimed in claim 1, wherein the light chambers each comprise at least one electrical light source.

6. The display element as claimed in claim 5, wherein each electrical light source comprises a light emitting diode (LED).

7. The display element as claimed in claim 1, wherein the display element further comprises:
- a plurality of individually controlled light sources arranged on the printed circuit board, between the printed circuit board and the dial plate, and
- each optical waveguide separates a pair of adjacent light sources.

8. The display element as claimed in claim 7, wherein each optical waveguide extends substantially perpendicular to the printed circuit board and the dial plate.

9. The display element as claimed in claim 7, wherein all optical waveguides extend substantially in parallel from the printed circuit board to the dial plate.

10. A display instrument comprising the display element as claimed in claim 1.

11. A vehicle comprising the display instrument as claimed in claim 10.

12. The vehicle as claimed in claim 11, wherein the display instrument is selected from the group consisting of a fuel indicator, a speedometer and a tachometer.

13. A display method, comprising:
providing a display element having plurality of light chambers arranged alongside one another, each light chamber comprising:
- a light barrier to a respectively adjacent light chamber; and
- an optical waveguide provided for each light chamber so as to be spaced apart from the optical waveguide of the respectively adjacent light chamber, wherein each optical waveguide has a side which is light-nontransmissive or only partly light-transmissive, to thereby form the light barrier to the respectively adjacent light chamber; and illuminating a plurality of immediately adjacent light chambers such that between currently illuminated light chambers no light chamber is left unilluminated and an uninterrupted bar is represented by the currently illuminated light chambers of the display element, wherein
the display element further comprises:
- a printed circuit board; and
- a dial plate arranged substantially parallel to the printed circuit board, and each optical waveguide extends from the printed circuit board to the dial plate, each optical waveguide having a lower edge flush with the printed circuit board and an upper edge flush with the dial plate.

14. A method comprising:
partitioning a display element into light chambers using a plurality of optical waveguides, each optical waveguide having a light-nontransmissive or only partly light-transmissive side to form a light barrier between a pair of respectively adjacent light chambers; and wherein each optical waveguide is spaced apart from the optical waveguide of a respectively adjacent light chamber, wherein
the display element further comprises:
- a printed circuit board; and
- a dial plate arranged substantially parallel to the printed circuit board, and each optical waveguide extends from the printed circuit board to the dial plate, each optical waveguide having a lower edge flush with the printed circuit board and an upper edge flush with the dial plate.

\* \* \* \* \*

UNITED STATES PATENT AND TRADEMARK OFFICE
CERTIFICATE OF CORRECTION

PATENT NO. : 9,333,910 B2  
APPLICATION NO. : 14/413764  
DATED : May 10, 2016  
INVENTOR(S) : Stephan Schwantner Page 1 of 1

It is certified that error appears in the above-identified patent and that said Letters Patent is hereby corrected as shown below:

In the claims:

Claim 1, Column 4, Line 42  
Delete "chamber." and insert --chamber,--, therefor.

Claim 1, Column 4, Line 50  
Delete "edged" and insert --edge--, therefor.

Claim 14, Column 6, Line 29  
After "board," delete "and".

Signed and Sealed this  
Twenty-third Day of August, 2016

Michelle K. Lee  
*Director of the United States Patent and Trademark Office*